United States Patent
Harper et al.

(10) Patent No.: US 9,251,821 B1
(45) Date of Patent: Feb. 2, 2016

(54) ATTENUATION OF A PITCH MODE FOR ACTUATOR ASSEMBLIES HAVING MULTIPLE DEGREES OF FREEDOM

(71) Applicant: International Business Machines Corporation, Armonk, NY (US)

(72) Inventors: David H. F. Harper, Vail, AZ (US); Hugo E. Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/682,011

(22) Filed: Apr. 8, 2015

(51) Int. Cl.
G11B 5/55 (2006.01)
G11B 5/48 (2006.01)
G11B 5/584 (2006.01)

(52) U.S. Cl.
CPC ............ G11B 5/4873 (2013.01); G11B 5/4893 (2013.01); G11B 5/5504 (2013.01); G11B 5/584 (2013.01)

(58) Field of Classification Search
CPC ........ G11B 5/5504; G11B 5/584; G11B 5/56; G11B 21/02; G11B 5/4893; G11B 5/4873
USPC .............. 360/261.1, 291, 77.12, 241.1, 241.3
See application file for complete search history.

(56) References Cited

U.S. PATENT DOCUMENTS

| | | | | |
|---|---|---|---|---|
| 5,377,052 A | * | 12/1994 | Guzman et al. | 360/261.1 |
| 5,508,865 A | * | 4/1996 | La Garcia et al. | 360/291 |
| 5,566,039 A | * | 10/1996 | Spicer | 360/261.1 |
| 5,680,278 A | * | 10/1997 | Sawtelle, Jr. | 360/261 |
| 5,949,619 A | * | 9/1999 | Eckberg et al. | 360/291 |
| 6,137,659 A | | 10/2000 | Warmenhoven | |
| 6,195,238 B1 | * | 2/2001 | Yeakley et al. | 360/291.2 |
| 6,307,718 B1 | * | 10/2001 | Kasetty | 360/291.1 |

(Continued)

FOREIGN PATENT DOCUMENTS

| | | |
|---|---|---|
| EP | 1202273 A2 | 5/2002 |
| EP | 1223664 A2 | 7/2002 |

(Continued)

OTHER PUBLICATIONS

Boettcher et al., "Dynamic Modeling and Control of a Piezo-Electric Dual-Stage Tape Servo Actuator," IEEE Transactions on Magnetics, vol. 45, No. 7, Jul. 2009, pp. 3017-3024.

(Continued)

*Primary Examiner* — Brian Miller
(74) *Attorney, Agent, or Firm* — Zilka-Kotab, PC

(57) ABSTRACT

An apparatus, in one embodiment, includes: a pivot assembly pivotably supporting a head carriage assembly, a motor coupled to the head carriage assembly for rotatably positioning the head carriage assembly about an axis of skew which extends perpendicular to a plane defined by an intended direction of media movement across the head carriage assembly and a direction of fine motion of the head carriage assembly, the fine motion direction being oriented perpendicular to the intended direction of media movement, a linear assembly supporting the pivot assembly and the head carriage assembly, the linear assembly being configured to move along the fine motion direction, and a first flexure extending between the head carriage assembly and the linear assembly, the first flexure permitting the rotatable positioning of the head carriage assembly about the axis of skew, the first flexure resisting pitching movement of the head carriage assembly relative to the linear assembly.

20 Claims, 12 Drawing Sheets

(56) References Cited

U.S. PATENT DOCUMENTS

| | | | |
|---|---|---|---|
| 6,333,838 B1 * | 12/2001 | Anderson | 360/261.1 |
| 6,442,004 B1 | 8/2002 | Heinz | |
| 7,248,443 B2 | 7/2007 | Kwon et al. | |
| 7,359,160 B2 * | 4/2008 | Koga et al. | 360/291 |
| 7,649,710 B2 * | 1/2010 | Bui et al. | 360/77.12 |
| 8,027,121 B2 * | 9/2011 | Argumedo et al. | 360/77.12 |
| 8,035,926 B2 * | 10/2011 | Harper | 360/261.1 |
| 2001/0017749 A1 | 8/2001 | Stefansky | |
| 2004/0070865 A1 | 4/2004 | Sri-Jayantha et al. | |
| 2004/0120078 A1 | 6/2004 | Berding et al. | |
| 2006/0103968 A1 * | 5/2006 | Jurneke | 360/76 |
| 2007/0171577 A1 | 7/2007 | Ycas | |
| 2011/0075527 A1 | 3/2011 | Hirata et al. | |
| 2011/0102937 A1 | 5/2011 | Argumedo et al. | |
| 2013/0170072 A1 | 7/2013 | Meyer | |

FOREIGN PATENT DOCUMENTS

| | | |
|---|---|---|
| GB | 2467841 A | 8/2010 |
| GB | 2501521 A | 10/2013 |
| WO | 2007098277 A2 | 8/2007 |

OTHER PUBLICATIONS

Harper et al., U.S. Appl. No. 14/682,020, filed Apr. 8, 2015.
Non-Final Office Action from U.S. Appl. No. 14/682,020, dated Jul. 17, 2015.

* cited by examiner

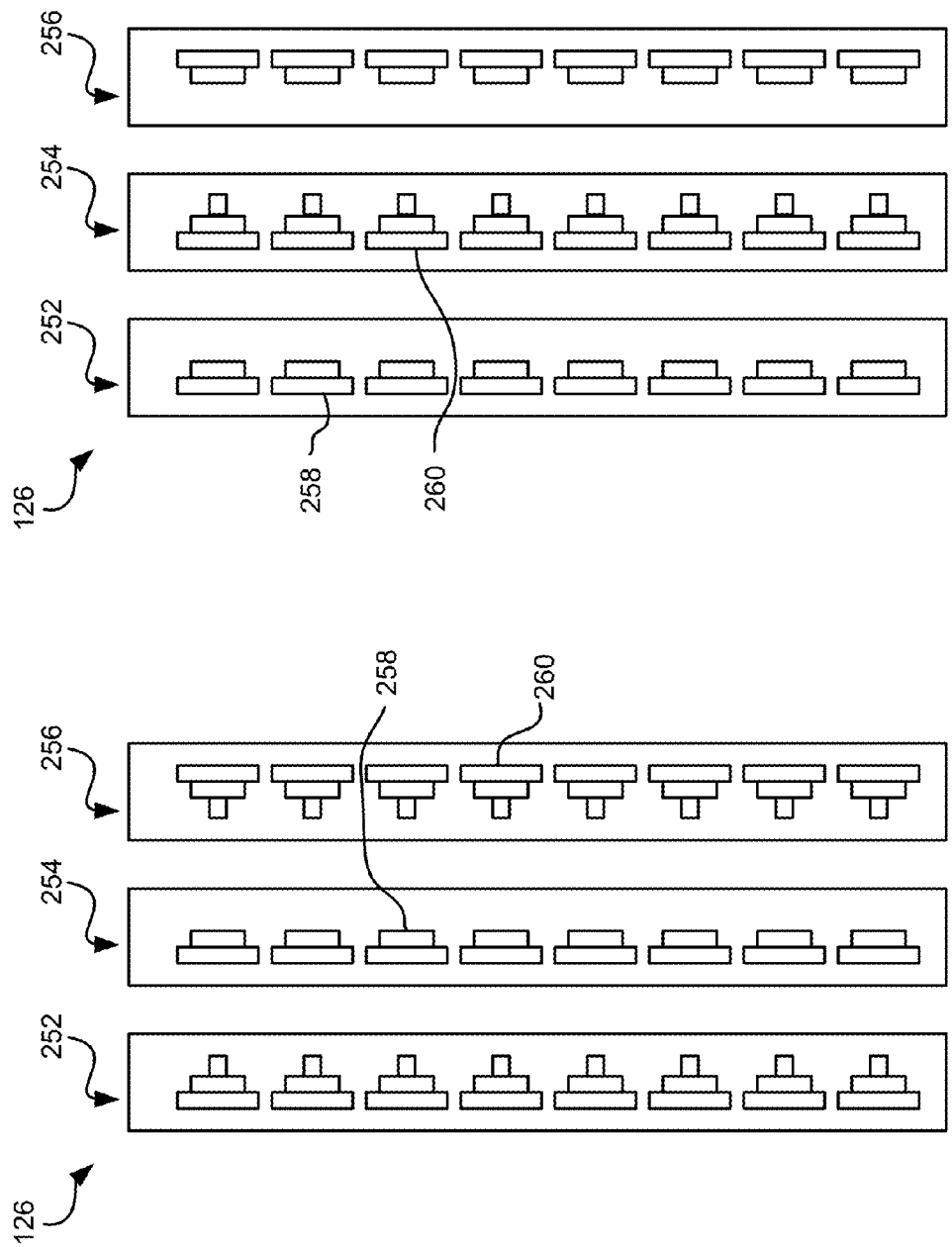

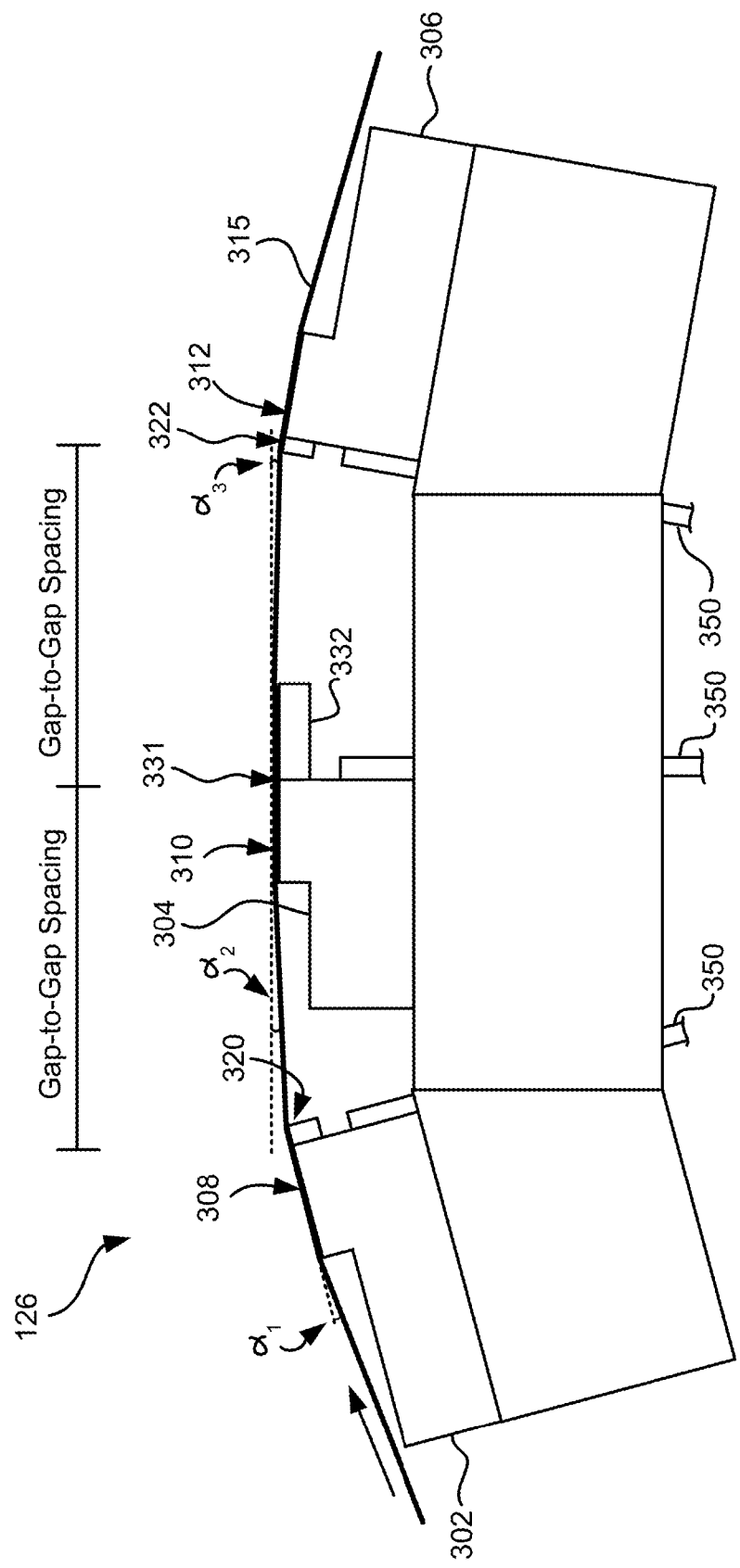

ATTENUATION OF A PITCH MODE FOR ACTUATOR ASSEMBLIES HAVING MULTIPLE DEGREES OF FREEDOM

BACKGROUND

The present invention relates to data storage systems, and more particularly, this invention relates to improved controllability of actuator assemblies having multiple degrees of freedom.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. In a tape drive system, the drive moves the magnetic tape over the surface of the tape head at high speed. Moreover, read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

BRIEF SUMMARY

An apparatus, according to one embodiment, includes: a pivot assembly pivotably supporting a head carriage assembly, a motor coupled to the head carriage assembly for rotatably positioning the head carriage assembly about an axis of skew which extends perpendicular to a plane defined by an intended direction of media movement across the head carriage assembly and a direction of fine motion of the head carriage assembly, the fine motion direction being oriented perpendicular to the intended direction of media movement, a linear assembly supporting the pivot assembly and the head carriage assembly, the linear assembly being configured to move along the fine motion direction, and a first flexure extending between the head carriage assembly and the linear assembly, the first flexure permitting the rotatable positioning of the head carriage assembly about the axis of skew, the first flexure resisting pitching movement of the head carriage assembly relative to the linear assembly.

An apparatus, according to another embodiment, includes: a pivot assembly pivotably supporting a head carriage assembly, a motor coupled to the head carriage assembly for rotatably positioning the head carriage assembly about an axis of skew which extends perpendicular to a plane defined by an intended direction of tape movement across the head carriage assembly and a direction of fine motion of the head carriage assembly, the fine motion direction being oriented perpendicular to the intended direction of tape movement, a linear assembly supporting the pivot assembly and the head carriage assembly, the linear assembly being configured to move along the fine motion direction, a first flexure extending between the head carriage assembly and the linear assembly, the first flexure permitting the rotatable positioning of the head carriage assembly about the axis of skew, the first flexure resisting pitching movement of the head carriage assembly relative to the linear assembly, a magnetic head mounted to the head carriage assembly, a drive mechanism for passing a magnetic tape over the magnetic head, and a controller electrically coupled to the motor.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 7 is a side view of a magnetic tape head with three modules in an overwrap configuration.

DETAILED DESCRIPTION

Figure 1A:
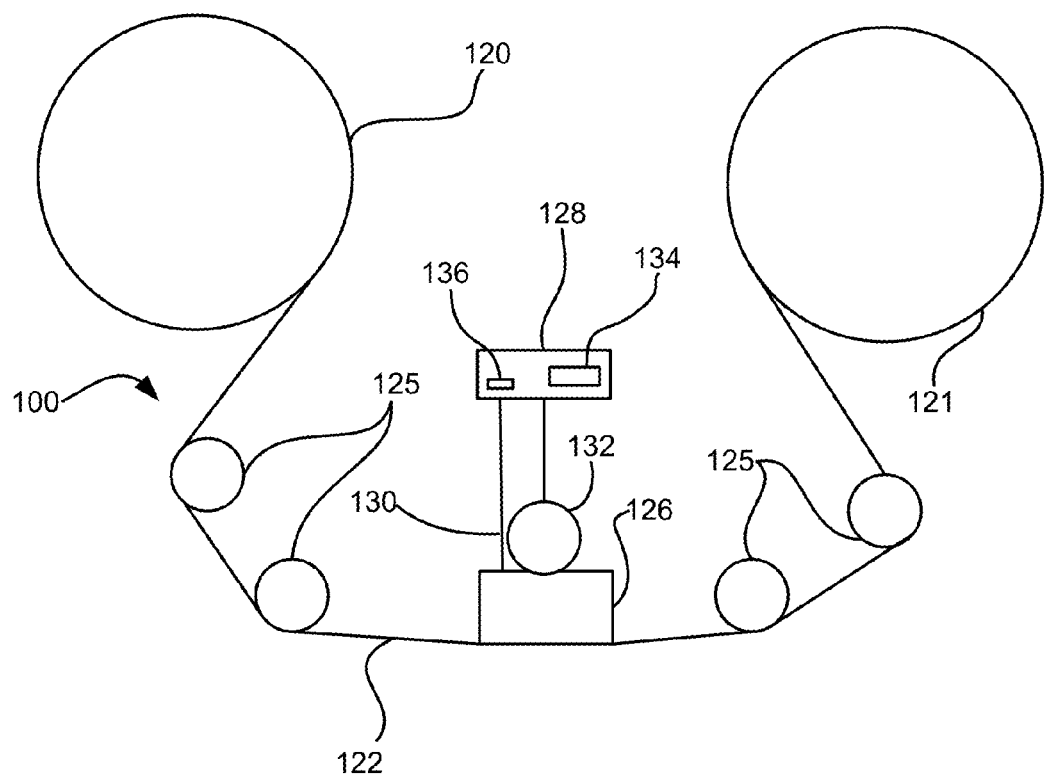
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes: a pivot assembly pivotably supporting a head carriage assembly, a motor coupled to the head carriage assembly for rotatably positioning the head carriage assembly about an axis of skew which extends perpendicular to a plane defined by an intended direction of media movement across the head carriage assembly and a direction of fine motion of the head carriage assembly, the fine motion direction being oriented perpendicular to the intended direction of media movement, a linear assembly supporting the pivot assembly and the head carriage assembly, the linear assembly being configured to move along the fine motion direction, and a first flexure extending between the head carriage assembly and the linear assembly, the first flexure permitting the rotatable positioning of the head carriage assembly about the axis of skew, the first flexure resisting pitching movement of the head carriage assembly relative to the linear assembly.

In another general embodiment, an apparatus includes: a pivot assembly pivotably supporting a head carriage assembly, a motor coupled to the head carriage assembly for rotatably positioning the head carriage assembly about an axis of skew which extends perpendicular to a plane defined by an intended direction of tape movement across the head carriage assembly and a direction of fine motion of the head carriage assembly, the fine motion direction being oriented perpendicular to the intended direction of tape movement, a linear assembly supporting the pivot assembly and the head carriage assembly, the linear assembly being configured to move along the fine motion direction, a first flexure extending between the head carriage assembly and the linear assembly, the first flexure permitting the rotatable positioning of the head carriage assembly about the axis of skew, the first flexure resisting pitching movement of the head carriage assembly relative to the linear assembly, a magnetic head mounted to the head carriage assembly, a drive mechanism for passing a magnetic tape over the magnetic head, and a controller electrically coupled to the motor.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits which transmit data to the head 126 to be recorded on the tape 122 and which receive data read by the head 126 from the tape 122. Moreover, an actuator assembly 132 controls a position of the head 126 relative to the tape 122. The actuator assembly 132 may include a coarse actuator, fine actuator, worm screw, etc. depending on the desired embodiment. According to some exemplary embodiments, the actuator assembly 132 may include one or more components which enable multiple degrees of freedom for the head 126 relative to the tape 122, as will be described in further detail below, e.g., see FIGS. 8A-8C.

Referring still to FIG. 1A, an interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
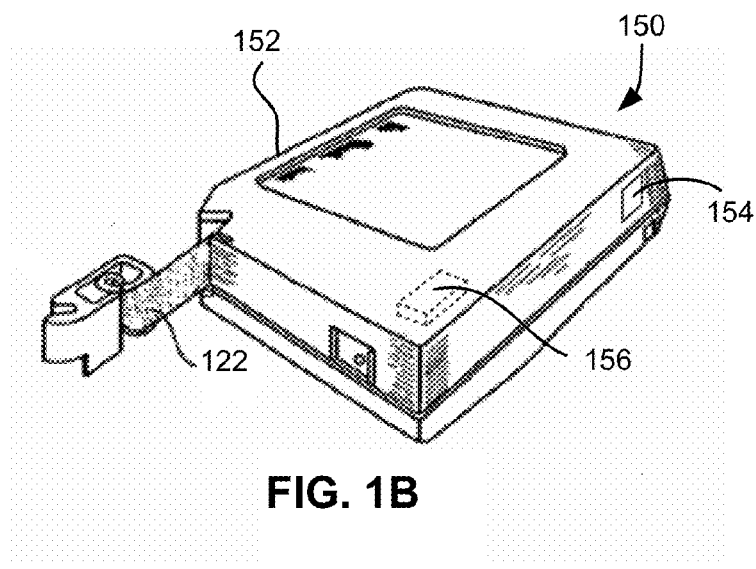
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
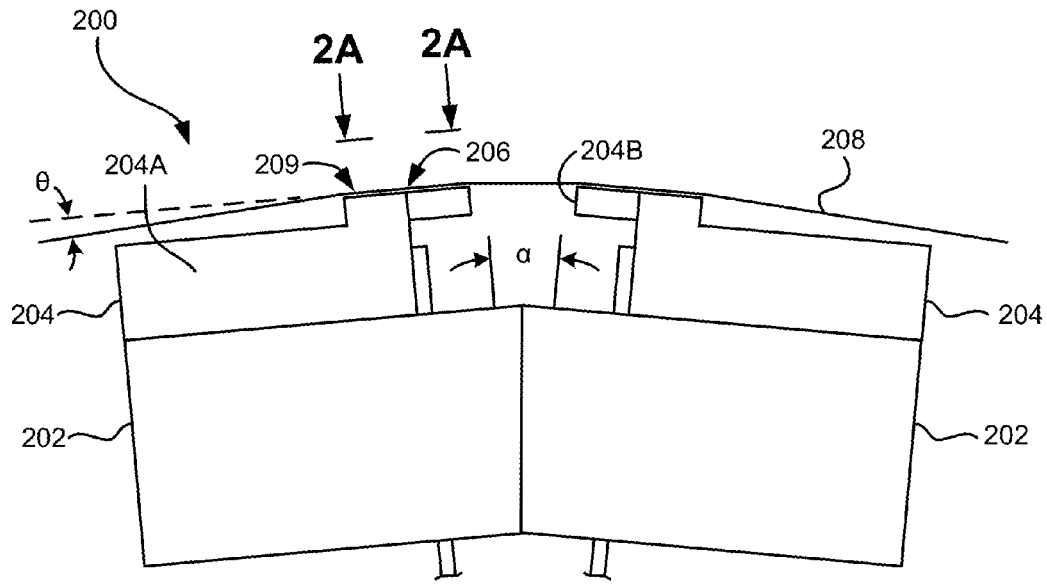
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
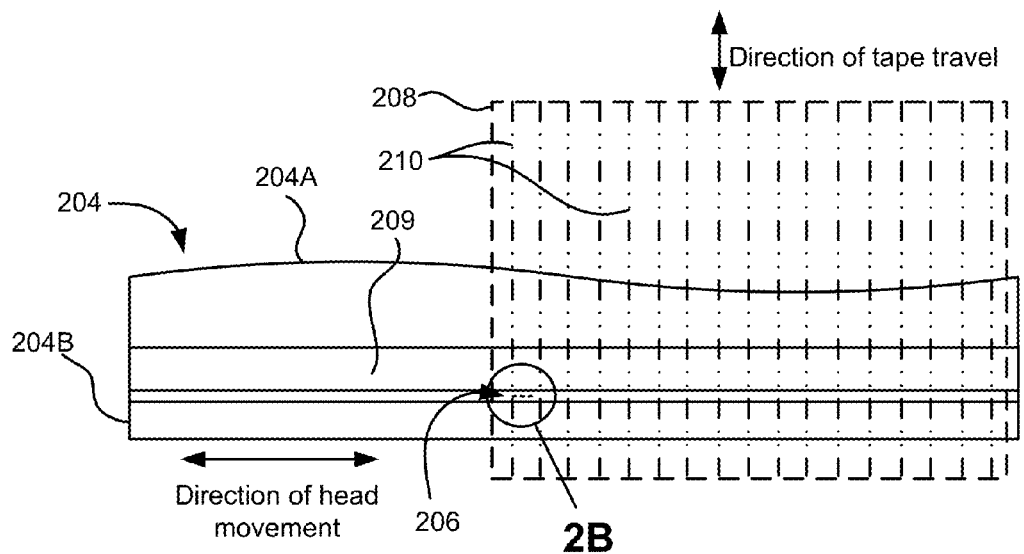
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
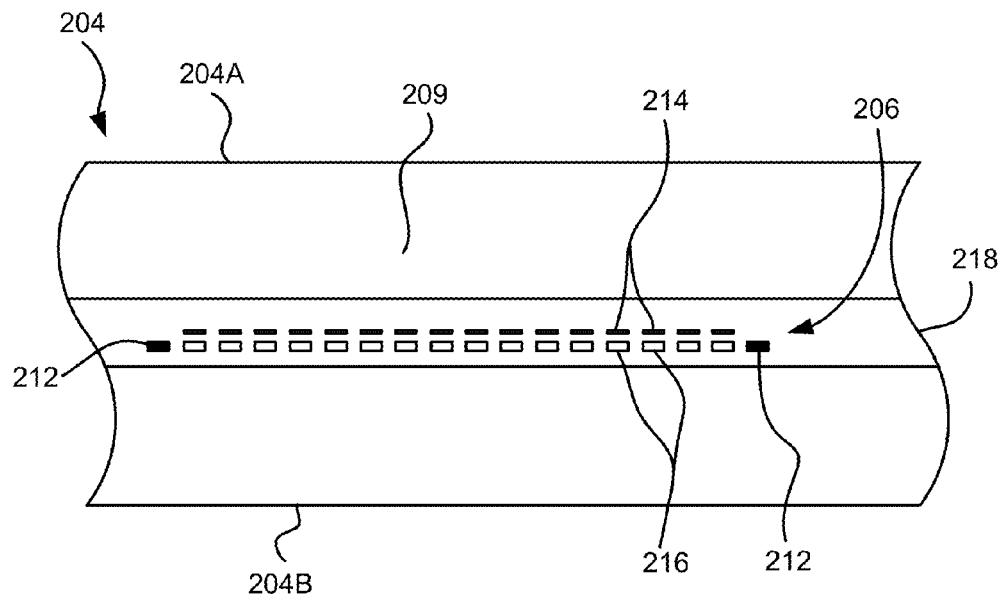
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
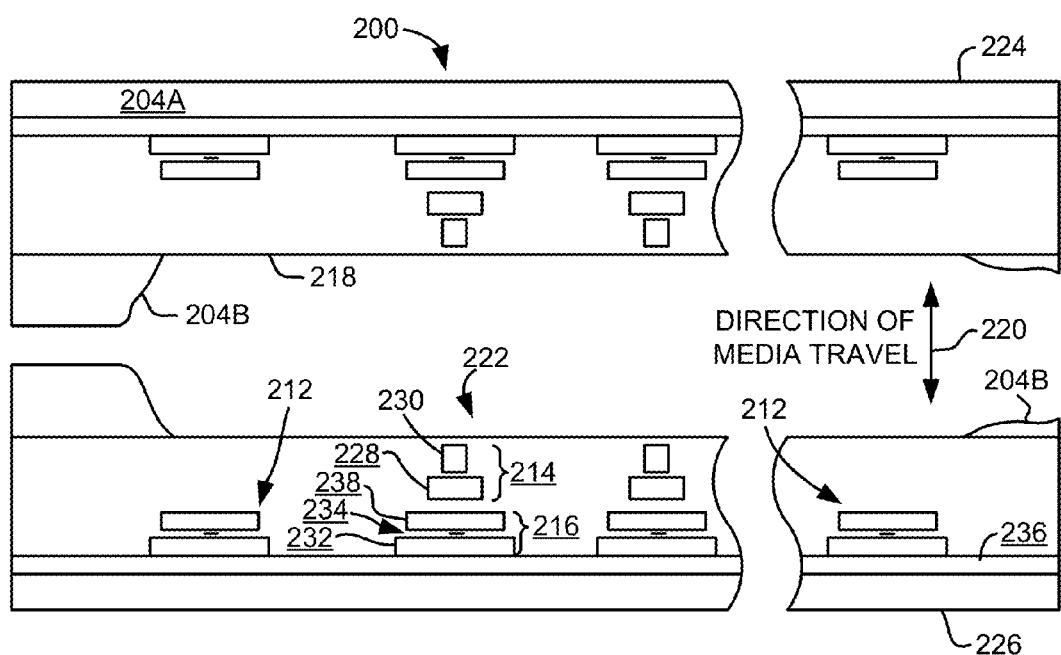
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of movement of a tape medium thereacross to form an R/W pair, exemplified by the R/W pair 222. Note that the intended direction of tape movement is also referred to herein as an "intended direction of tape travel" and sometimes referred to herein as the direction of tape travel; accordingly such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
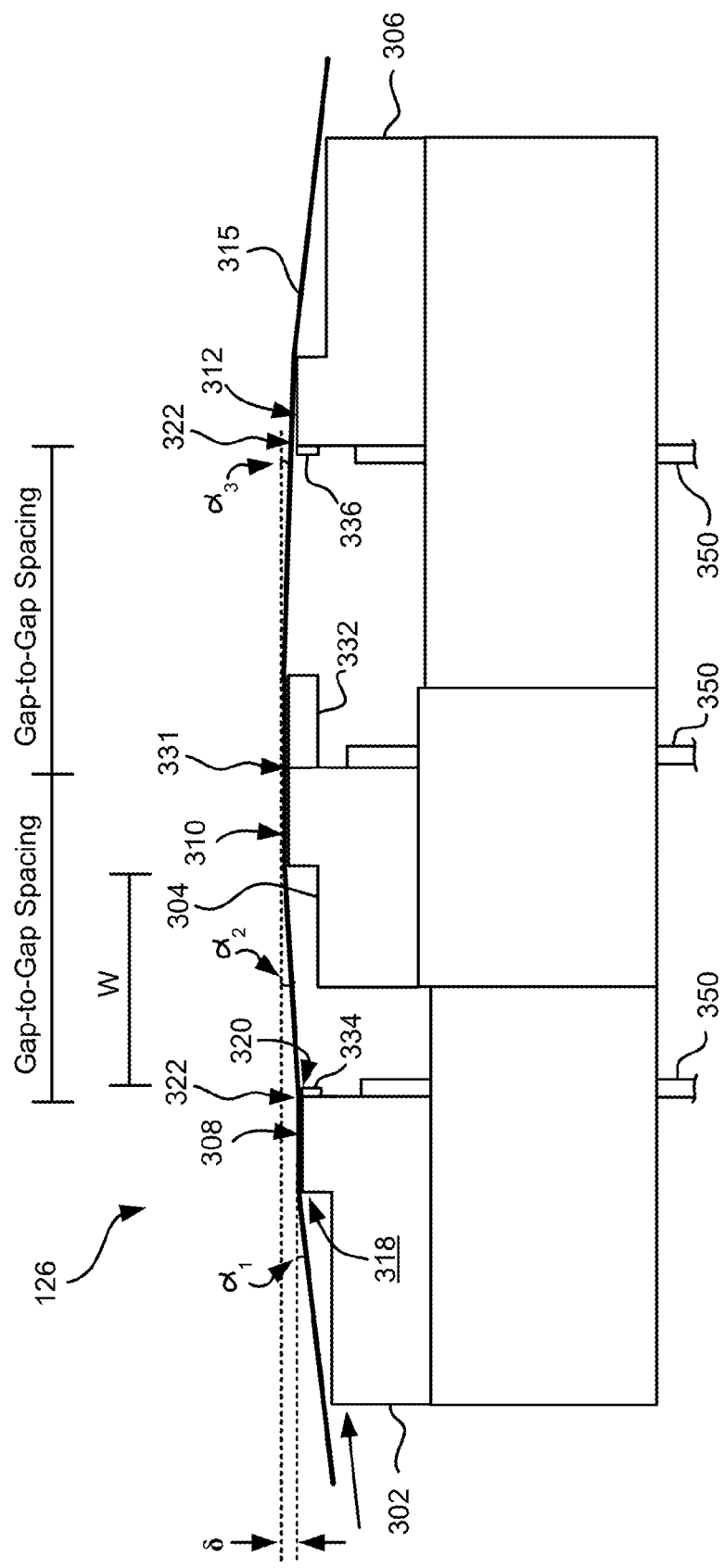
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
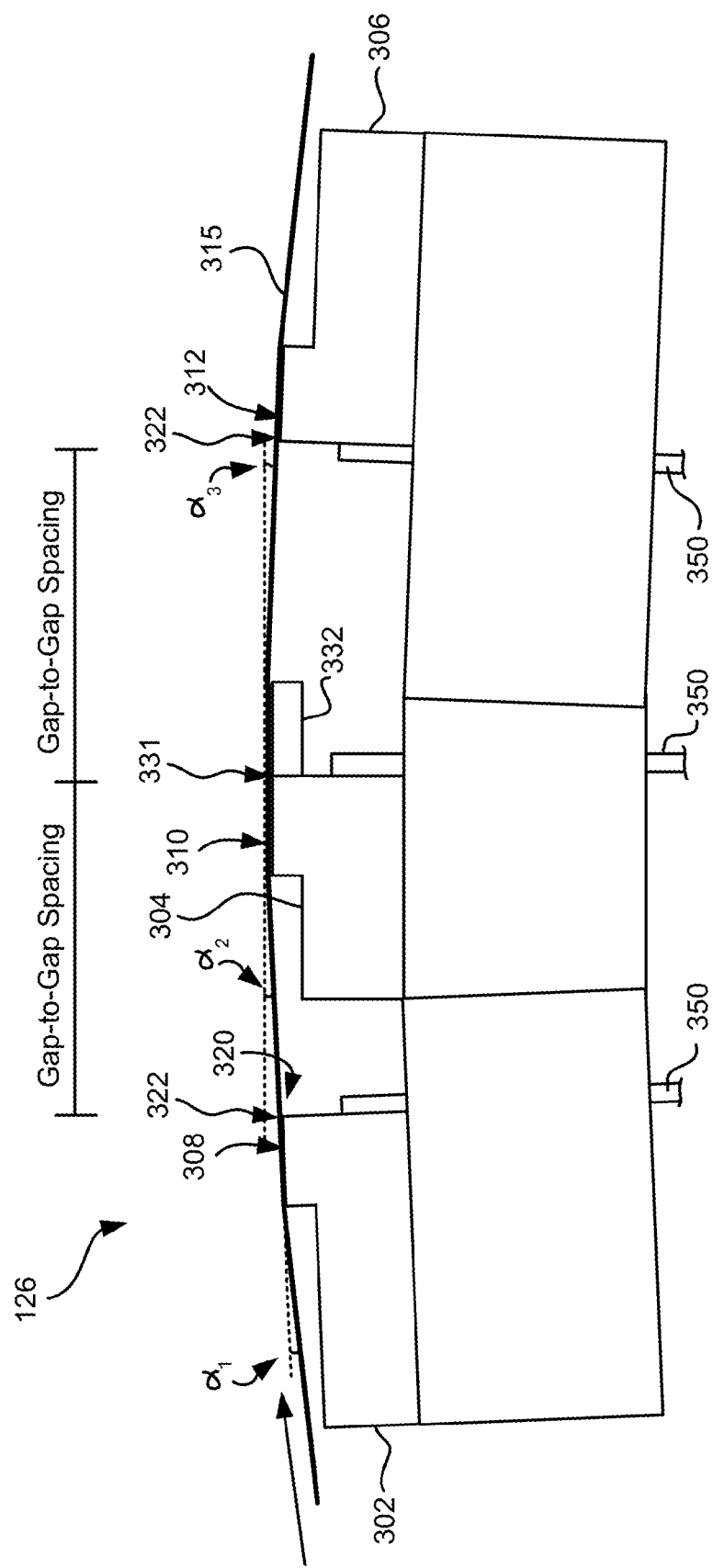
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302,

304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, actuator assemblies according to various embodiments may have multiple degrees of freedom. Such actuators may be able to selectively adjust the orientation and/or position of a magnetic head with respect to a magnetic medium during operation thereof. Accordingly, actuator assemblies having control over multiple degrees of freedom may be able to compensate for various operational conditions, e.g., tape skew, tape shifting, etc.

However, conventional products having multiple degrees of freedom experience an undesirable pitching motion during operation which degrades readback quality and inhibits track following performance.

In sharp contrast, various embodiments described herein introduce a number of configurations which reduce pitching motion and thereby desirably improve performance.

Figure 8A:
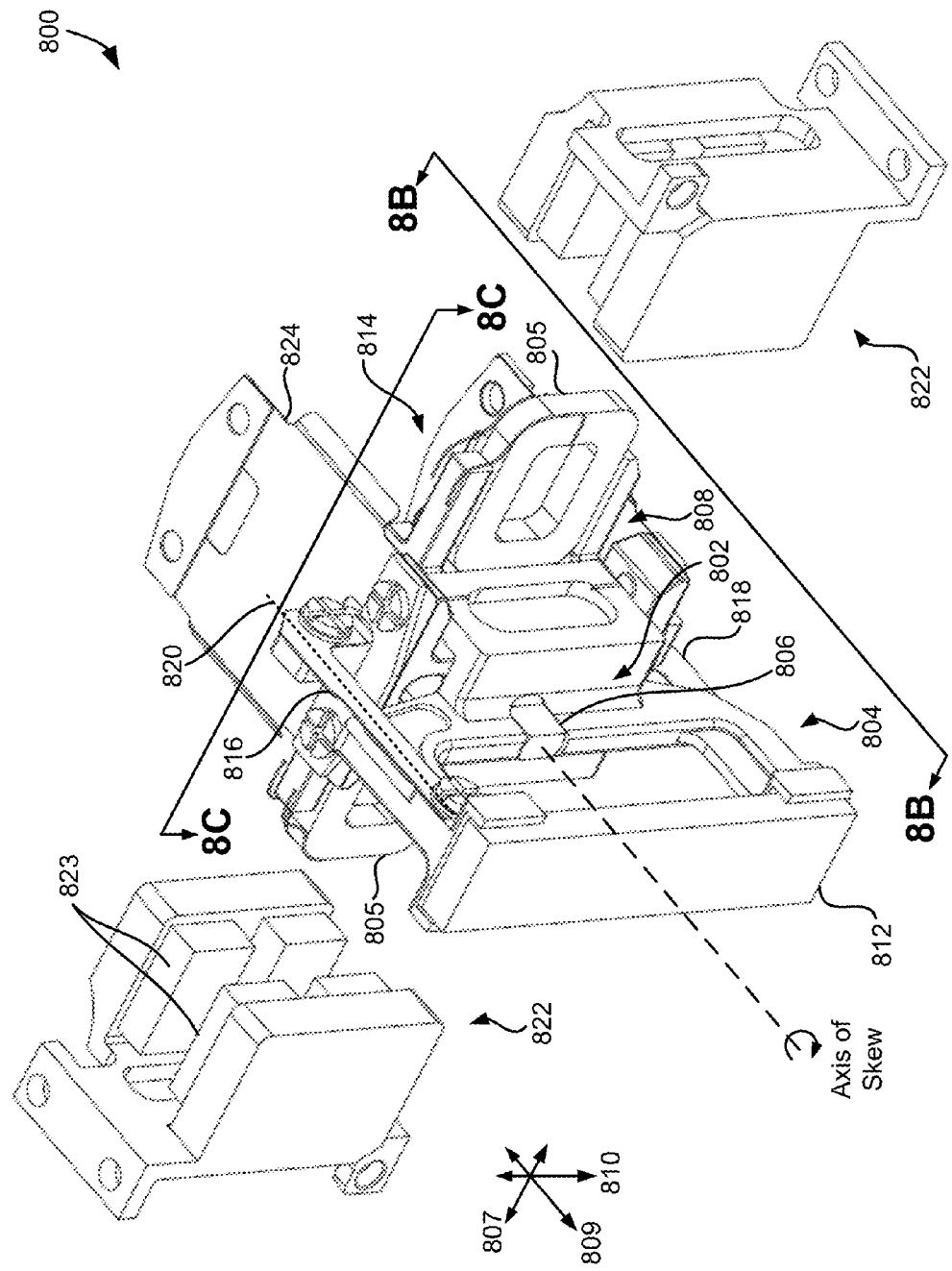
FIG. 8A is an exploded partial perspective view of an apparatus according to one embodiment.
Figure 8B:
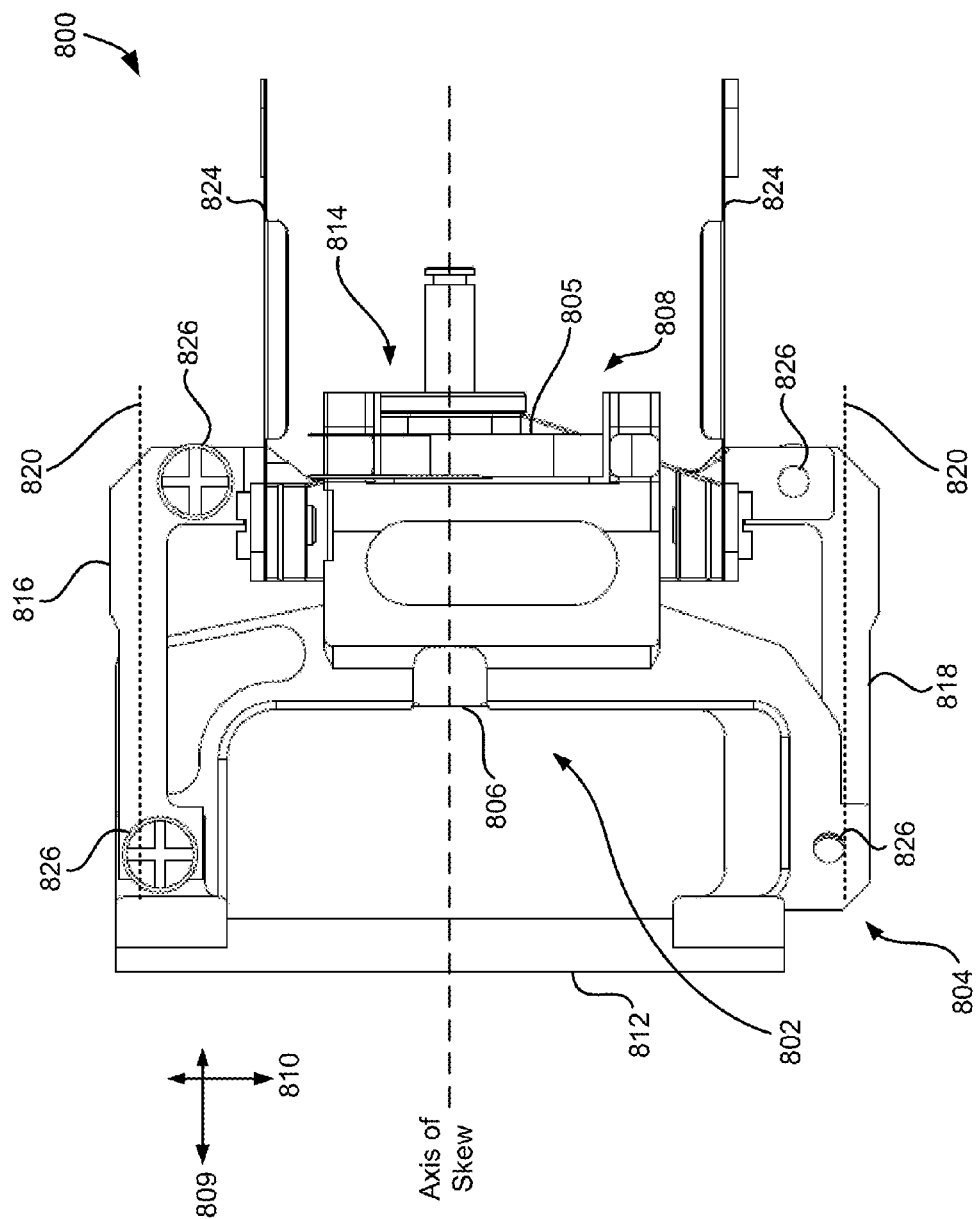
FIG. 8B is a side view of the apparatus from FIG. 8A taken along line 8B-8B.
Figure 8C:
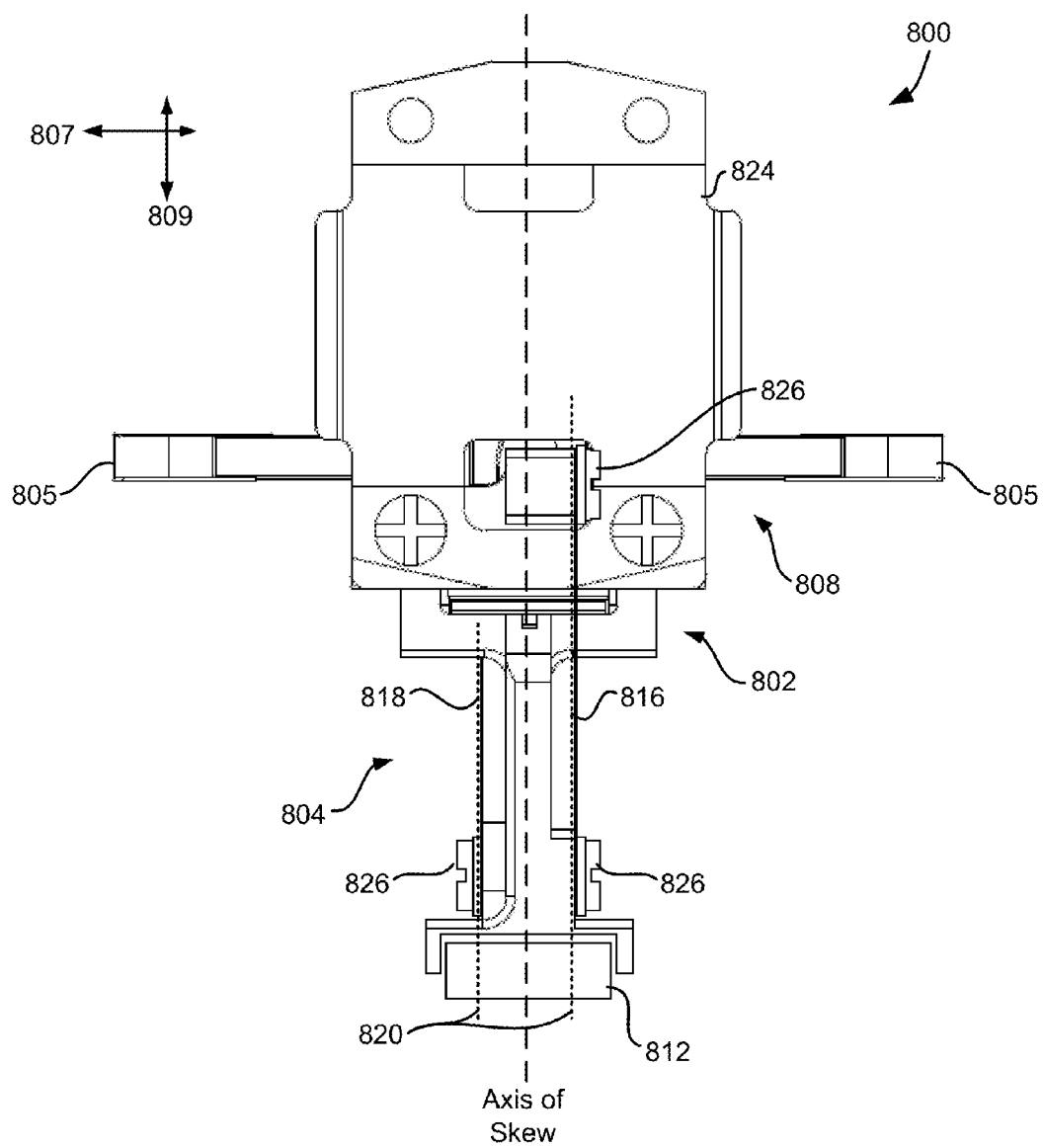
FIG. 8C is a top-down view of the apparatus from FIG. 8A taken along line 8C-8C.

FIGS. 8A-8C depict an apparatus 800, in accordance with one embodiment. As an option, the present apparatus 800 may be implemented in conjunction with features from any other embodiment listed herein, such as those described with reference to the other FIGS., such as FIGS. 1A-7. However, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8C (and the other FIGS.) may be deemed to include any possible permutation.

Referring now to FIGS. 8A-8C, the apparatus 800 includes a pivot assembly 802 which is coupled to a head carriage assembly 804. The pivot assembly 802 is preferably coupled to the head carriage assembly 804 such that the pivot assembly 802 pivotably supports the head carriage assembly 804 and head module 812, e.g., via a pivot pin 806. The pivot pin 806 may implement a bushing-pin configuration, as would be appreciated by one skilled in the art upon reading the present description.

Accordingly the head carriage assembly 804 may be able to rotate about an axis of skew, which is illustrated as extending through about the axis of the pivot pin 806. Specifically, the axis of skew extends perpendicular to a plane defined by an intended direction of media movement 807 across the head carriage assembly 804 and a fine motion direction 810 of the head carriage assembly 804. The direction of fine motion (fine motion direction 810) is oriented about perpendicular to the intended direction of media movement 807 such that a position of the head carriage assembly 804 relative to the data tracks of a magnetic tape being passed thereover may be adjusted as desired, e.g., to compensate for shifting of the tape during operation.

Apparatus 800 additionally includes a motor 808 coupled to the head carriage assembly 804 which may be used to rotatably position the head carriage assembly 804 about the axis of skew. Thus, the motor 808 may be used to selectively rotate the head carriage assembly 804 about the axis of skew, thereby inducing a relative motion between the head carriage assembly 804 and the linear assembly 814 (described below). This ability to selectively rotate the head carriage assembly 804 about the axis of skew allows for the apparatus 800 to compensate for tape skew experienced during operation, e.g., while tape is being passed over the head module 812.

In addition to being able to rotatably position the head carriage assembly 804 about the axis of skew, the motor 808 may also be used to move the head carriage assembly 804 in the fine motion direction 810. Accordingly, apparatus 800 includes a linear assembly 814 which is configured to move along the fine motion direction 810. Fine motion flexure 824 ensures that the linear assembly 814 travels in the fine motion direction 810 by restricting motion in alternate directions, e.g., along the direction of tape travel 807.

The linear assembly 814 may additionally support the pivot pin 806. Thus, the motor 808 may be used to selectively position the head carriage assembly 804 in the fine motion direction 810 as desired. Moreover, the linear assembly 814 is preferably coupled to the head carriage assembly 804 (e.g., via pivot pin 806) such that the linear assembly 814 carries along the head carriage assembly 804 during movement in the fine motion direction 810 (described in further detail below). Accordingly, the motor 808 may enable the apparatus 800 to perform track following in addition to skew compensation during operation, preferably such that tape shifting may be overcome while reading from and/or writing to tape being passed over the head module 812.

According to an example, which is in no way intended to limit the invention, the motor 808 may be an electromagnetic motor, e.g., such as a Lorentz force motor, a voice coil motor, etc. As will be appreciated by one skilled in the art upon reading the description, movement may be induced upon applying a current to each of the coils 805 of the electromagnetic motor. Thus, appropriate selection of the current to apply to each of the coils of the electromagnetic motor may induce a movement of the head carriage assembly 804 about the axis of skew, e.g., for positioning the head carriage assembly relative to the intended direction of media movement 807. Moreover, appropriate selection of the current to apply to each of the coils may induce a movement of the head carriage assembly 804 in the fine motion direction 810, e.g., for track following. It follows that the apparatus 800 may be selectively positioned both in the fine motion direction 810 and about the axis of skew.

Looking to the embodiment illustrated in FIGS. 8A-8C, the motor 808 includes two independently operable coils 805. The coils 805 are positioned relative to field generators 822 such that the force generated by currents passing through the coils 805 when energized controls the position of the assembly, as would be appreciated by one skilled in the art upon reading the present description. The illustrative field generators 822 shown have a plurality of hard magnets 823. As a result, the coils 805 of motor 808 are capable of inducing movement in a common direction and/or in opposite directions by controlling the direction and magnitude of the current through each of the coils 805.

By using the coils 805 to induce movement in a common direction, the motor 808 is able to cause the head carriage assembly 804 to translate linearly along the fine motion direction 810. Similarly, by using the coils 805 to induce movement in a single direction but in unequal amounts, or in opposite (e.g., antiparallel) directions, the motor 808 is able to cause a rotation of the head carriage assembly 804 about the axis of rotation, e.g., at the pivot pin 806. Accordingly, current(s) may be applied to the coils 805 of motor 808 in different combinations, in terms of magnitude and/or direction, to induce different movements of the head carriage assembly 804 and/or linear assembly 814.

It should be noted that although the motor 808 is depicted in the present embodiment as being used to enable selective movement of the head carriage assembly 804 in the fine motion direction 810 as well as rotatably position the head carriage assembly 804 about the axis of skew, different types of motor configurations may be used to enable the respective movement in different embodiments. For example, according to alternative approaches, a first motor may be used to selectively move the head carriage assembly 804 in the fine motion direction 810 while a second motor may be used to rotatably position the head carriage assembly 804 about the axis of skew.

Referring still to FIGS. 8A-8C, the linear assembly 814 is illustrated in the present embodiment as supporting the pivot assembly 802 and the head carriage assembly 804, e.g., by being coupled thereto via pivot pin 806 extending therebetween. Thus, as the linear assembly 814 moves along the fine motion direction 810, the pivot assembly 802 and the head carriage assembly 804 move as well. As previously mentioned, the linear assembly 814, the pivot assembly 802 and the head carriage assembly 804 effectively move as a single piece in the fine motion direction 810.

Additionally, first and second flexures 816, 818 extend between the head carriage assembly 804 and the linear assembly 814. Flexures 816, 818 as seen in FIGS. 8A-8C, or in accordance with any of the other embodiments described and/or suggested herein, are included to prevent an undesirable pitching motion from occurring during reading from and/or writing to a tape which may be traveling over the head module 812. Pitching motion occurs when at least a portion of the apparatus moves in a pivoting fashion about an axis of the apparatus oriented along direction 807.

Pitching may occur as a result of the pivot pin 806 serving as the only component coupling the head carriage assembly 804 and the remainder of the apparatus 800, e.g., the linear assembly 814. Various attempts to redesign the pivot pin 806 itself to overcome this pitching motion proved to be unrealistic, e.g., due to spatial constraints in the apparatus 800. However, by implementing the flexures 816, 818 as disclosed herein, the pitching motion, which again is undesirable for head track following performance, is attenuated, as will be described in further detail below. As a result, the bandwidth potential of the apparatus 800 is increased, because of the resulting better track following performance achieved when pitching is attenuated.

With continued reference to FIGS. 8A-8C, the longitudinal axes 820 of the flexures 816, 818 extend from the head carriage assembly 804 to the linear assembly 814 in a direction generally parallel to the axis of skew, e.g., within about 15 degrees from being parallel with the axis of skew. First ends of the flexures 816, 818 are preferably coupled to the head carriage assembly 804 while second ends of the flexures 816, 818 are coupled to the linear assembly 814. It should be noted that the term "ends" is in no way intended to limit the invention. According to alternate approaches, portions of the first and/or second flexures 816, 818 may extend beyond the points of contact with the head carriage assembly 804 and/or the linear assembly 814, e.g., depending on available space. Moreover, although the flexures 816, 818 are illustrated in the present embodiment as being coupled to the head carriage assembly 804 and the linear assembly 814 using bolts 826, the flexures 816, 818 may be coupled to the head carriage assembly 804 and/or the linear assembly 814 using any of the approaches described below, e.g., see description of FIGS. 9A-9B.

As described above, it is preferred that the motor 808 is able to rotatably position the head carriage assembly 804 about the axis of skew. Thus, although the head carriage assembly 804 and the linear assembly 814 are coupled together by the flexures 816, 818, the ability to selectively rotate the head carriage assembly 804 about the axis of skew is preserved. Accordingly, the flexures 816, 818 are preferably able to permit the rotatable positioning of the head carriage assembly 804 about the axis of skew.

Figure 9A:
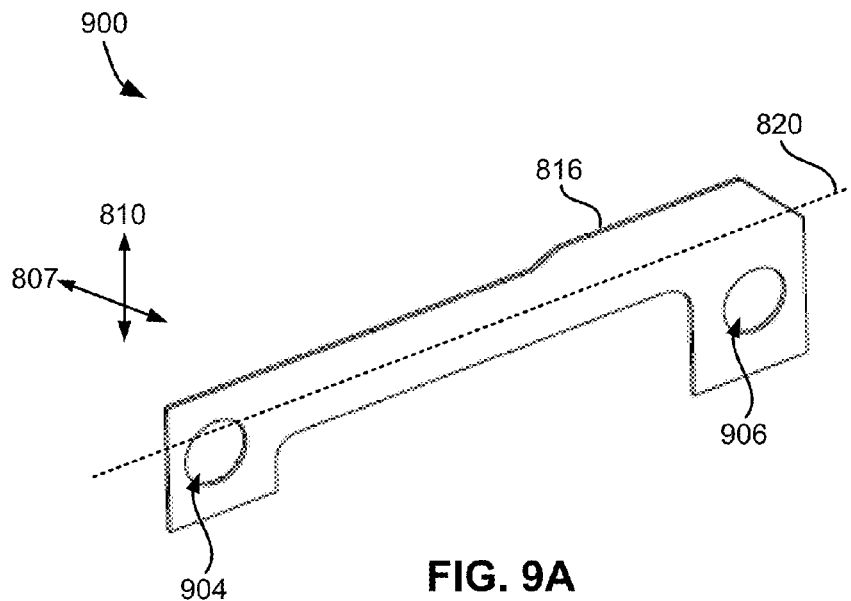
FIG. 9A is a partial perspective view of a flexure according to one embodiment.
Figure 9B:
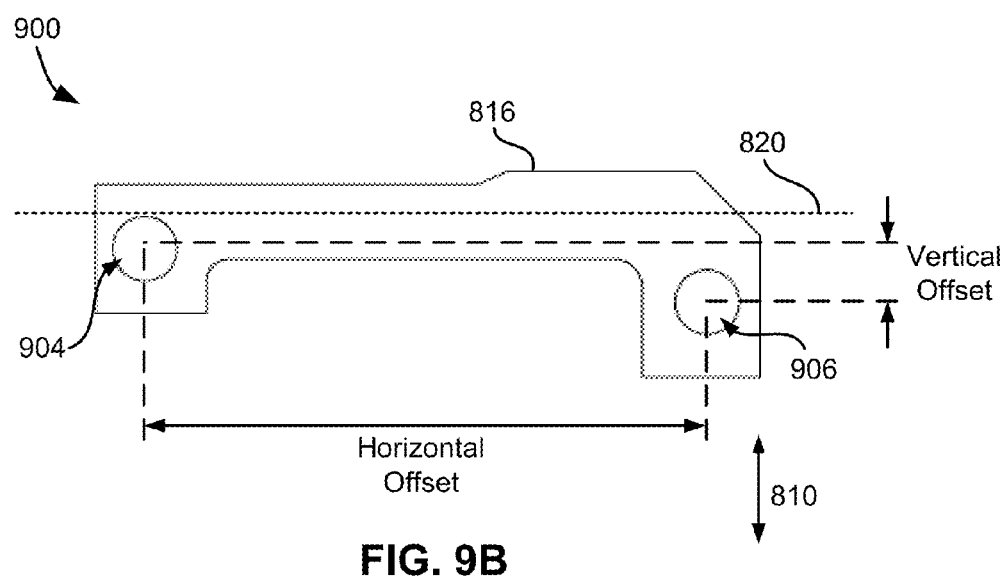
FIG. 9B is a side view of the flexure from FIG. 9A.

Looking to FIGS. 9A-9B, detailed views of a flexure 900 are shown, in accordance with one embodiment. As an option, the present flexure 900 may be implemented in conjunction with features from any other embodiment listed herein, such as those described with reference to the other FIGS., such as FIGS. 8A-8C. Specifically, FIGS. 9A-9B illustrate detailed views of a flexure as presented in the embodiment of FIGS. 8A-8C. Accordingly, various components of FIGS. 9A-9B have common numbering with those of FIGS. 8A-8C.

However, such flexure 900 and others presented herein may be used in various applications and/or in permutations which may or may not be specifically described in the illustrative embodiments listed herein. Further, the flexure 900 presented herein may be used in any desired environment. Thus FIGS. 9A-9B (and the other FIGS.) may be deemed to include any possible permutation.

Flexure 900 is shown as having a rectangular cross section taken perpendicular to a longitudinal axis thereof. Moreover, a dimension of the cross section is greater (e.g., longer) in the fine motion direction 810 than the intended direction of media movement 807. A first mounting point 904 may be used to couple the flexure 900 to a head carriage assembly as seen in FIGS. 8A-8C, while a second mounting point 906 may be used to couple the flexure 900 to a linear assembly, again as seen in FIGS. 8A-8C. However, referring still to FIGS. 9A-9B, the aforementioned orientation of the flexure 900 is in no way intended to limit the invention. According to other approaches, the first mounting point 904 may be used to couple the flexure 900 to a linear assembly while the second mounting point 906 is used to couple the flexure 900 to a head carriage assembly.

According to various approaches, the flexure 900 may be coupled to another component using different components and/or processes. Accordingly, the flexure 900 may be coupled to a head carriage assembly and/or linear assembly using bolts, screws, tongue and groove joints, clips, clamp, spot welding, soldering, known coupling components and/or processes, etc., depending on the desired embodiment. It follows that, depending on the fashion which the flexure 900 is to be coupled to a head carriage assembly and/or linear assembly, the mounting points 904, 906 may be varied. For example, the mounting points 904, 906 are depicted as being circular holes in FIGS. 9A-9B which may correspond to using a bolt, screw, etc. to couple the flexure to the head carriage assembly and/or linear assembly. However, according to other examples, one or more of the mounting points 904, 906 may be a tongue, groove, clamp, etc., depending on the manner in which the flexure 900 may be coupled to a head carriage assembly and/or linear assembly.

The shape of flexure 900 preserves the ability to rotatably position the head carriage assembly 804 about the axis of skew without being over-constrained after implementing the flexure 900 in an apparatus. Referring still to FIGS. 9A-9B, the flexure 900 is depicted as having a generally "L-shaped" profile. This allows for the first and second mounting points 904, 906 to be offset from each other in the fine motion direction 810 (also referred to herein as a "vertical offset"). In other words, the centers of the first and second mounting points 904, 906 do not align in a direction parallel to the longitudinal axis 820 of the flexure 900. The vertical offset between mounting points 904, 906 causes torque in the flexure when opposite forces are applied to the flexure 900 at the mounting points 904, 906. For example, when rotatably positioning the head carriage assembly of an apparatus about an axis of skew as described above, opposite forces will be applied to the flexure 900 at the mounting points 904, 906, thereby introducing torque.

Thus, depending on the dimensions and/or properties of the flexure 900, torque applied to the flexure 900 may cause torsional deformation of the flexure 900. The vertical offset allows for the skew motion to occur without causing a high tension condition when the head carriage assembly 804 is rotated about the axis of skew.

Moreover, the first and second mounting points 904, 906 are also offset from each other in a direction perpendicular to the fine motion direction 810 (also referred to herein as a "horizontal offset"). The greater the value of the horizontal offset, the more susceptible the flexure is to torsional deformation. However, the horizontal offset is preferably low enough to prevent flexing (e.g., deformation) of the flexure 900 in the fine motion direction 810. It follows that the horizontal offset and vertical offset may be adjusted based on the desired embodiment, e.g., depending on flexure dimensions, materials, etc. However, vertical and/or horizontal offsets of one or more flexures may be constrained by the availability of space in a corresponding tape drive. For example, the hump along the top edge of the flexure 900 in FIGS. 9A-9B may be included in a given embodiment in an attempt to gain vertical height. Accordingly, it should be noted that according to different embodiments, variations of the design (e.g., profile) of the flexure 900 illustrated in FIGS. 9A-9B may be used.

Referring again to FIGS. 8A-8C, the flexures 816, 818 are preferably able to permit the rotatable positioning of the head carriage assembly 804 about the axis of skew. Thus, by selecting the dimensions and/or properties of the flexures 816, 818, a desired amount of deformation may be induced as a result of applying forces on the flexures 816, 818. Specifically, the motor 808 may cause the head carriage assembly 804 to rotate about the axis of skew while the linear assembly 814 is kept stationary. The relative rotation of the head carriage assembly 804 with respect to the linear assembly 814 causes opposite forces to be applied on the flexures 816, 818 at the mounting points (e.g., seen in FIGS. 9A-9B), resulting in the flexures 816, 818 experiencing a torsional force (e.g., torque) which causes them to torsionally deform. Accordingly, the flexures 816, 818 are desirably able to permit the rotatable positioning of the head carriage assembly 804 about the axis of skew.

It follows that the flexures 816, 818 may be resiliently deformable, e.g., such that any deformation of the flexures 816, 818 is fully recoverable when the forces are no longer being applied. According to an exemplary embodiment, which is in no way intended to limit the invention, the flexures 816, 818 may include steel having a thickness of about 0.1 mm. However, in other embodiments, one or more of the flexures 816, 818 may include plastics, metals, or other materials capable of withstanding prolonged, repetitive motion while maintaining structural integrity, and/or laminates thereof.

However, it is also desirable that the flexures 816, 818 are able to resist pitching movement of the head carriage assembly 804 relative to the linear assembly 814, thereby preserving the track following abilities of the linear assembly 814 in the fine motion direction 810. As described above with reference to FIGS. 9A-9B, flexures 816, 818 of FIGS. 8A-8C are presented herein as having a rectangular cross section taken perpendicular to a longitudinal axis thereof. Moreover, a dimension of the cross section is greater (e.g., longer) in the fine motion direction 810 than the intended direction of media movement 807. Accordingly, the flexures 816, 818 are effectively constrained from deforming in the fine motion direction 810. In other words, the length of the flexure along its longitudinal axis 820 enables the flexure to effectively resist any pitching motion, as the motion is working against the cross section of the flexure 900, which is resilient in nature. Moreover, it follows that the design of the flexure in the current embodiment allows for skew motion to occur with minimal resistance. The first and second flexures 816, 818 may be coupled to the head carriage assembly 804 and/or the linear assembly 814 using any approach which preserves the ability of the flexures 816, 818 to permit the rotatable positioning of the head carriage assembly 804 about the axis of skew, and resist the pitching movement of the head carriage assembly 804 relative to the linear assembly 814. Accordingly, the first and second flexures 816, 818 may be coupled to the head carriage assembly 804 and/or the linear assembly 814 using bolts, screws, tongue and groove joints, clips, etc., depending on the desired embodiment.

It is desirable that the first and second flexures 816, 818 are positioned symmetrically relative to each other about the axis of skew, e.g., as shown in FIGS. 8A-8C. Positioning the flexures 816, 818 symmetrically relative to each other about the axis of skew allows for improved rotational performance of the head carriage assembly 804. Thus, it is preferred that embodiments including two or more flexures implement symmetry among the flexures, e.g., about an axis of rotation, but in no way required. For example, two or more flexures may be asymmetrically positioned relative to an axis of rotation to increase a resistance of motion in a given direction (e.g., motion in the pitch direction). Moreover, although it is preferred that flexures 816, 818 include the same materials, dimensions, properties, etc., in some approaches, certain aspects of the flexures 816, 818 may differ.

Although apparatus 800 is depicted as including two flexures in FIGS. 8A-8C, the number of flexures that may be added to a given embodiment is in no way limited thereto. According to various embodiments, apparatus 800 may include one, two, three, four, multiple, etc. flexures. However, depending on the number of flexures included in a given embodiment, it again desirable, but in no way required, that the flexures are positioned symmetrically relative to each other about the axis of skew, as would be appreciated by one skilled in the art upon reading the present description.

The number of flexures included in a given embodiment may affect the desired properties of the flexures, e.g., such as thickness, length, material composition, etc. For example, the desired flexure properties for embodiments having two flexures (e.g., as seen in FIGS. 8A-8C) may include flexures that are more rigid than flexure properties desired for embodiments having four or six flexures. The more flexures used in a given embodiment, the more resistant the combined flexure effect is to torsion. Specifically, adjusting the properties of the flexures utilizes a correlation between the rigidity along the longitudinal axis of a flexure, and the flexure's resistance to torsion. Thus, by adjusting the flexure properties in different embodiments, the combined effect of two flexures may be about the same as the combined effect of a different number of flexures in another embodiment.

Figure 10A:
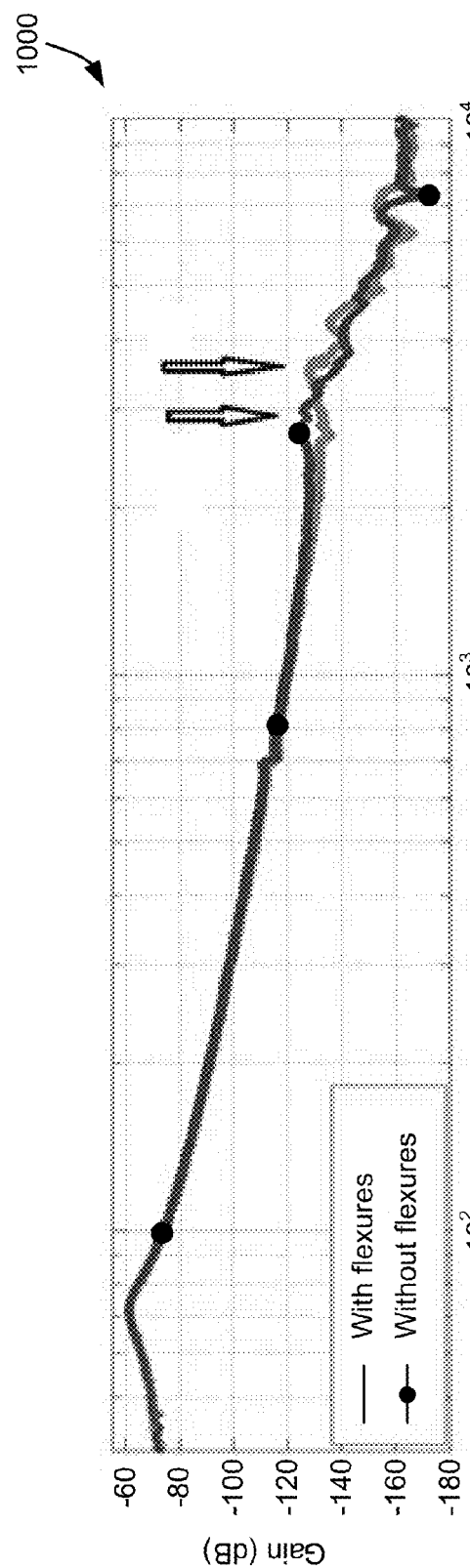
FIG. 10A is a graph of the gain vs. frequency for two embodiments.
Figure 10B:
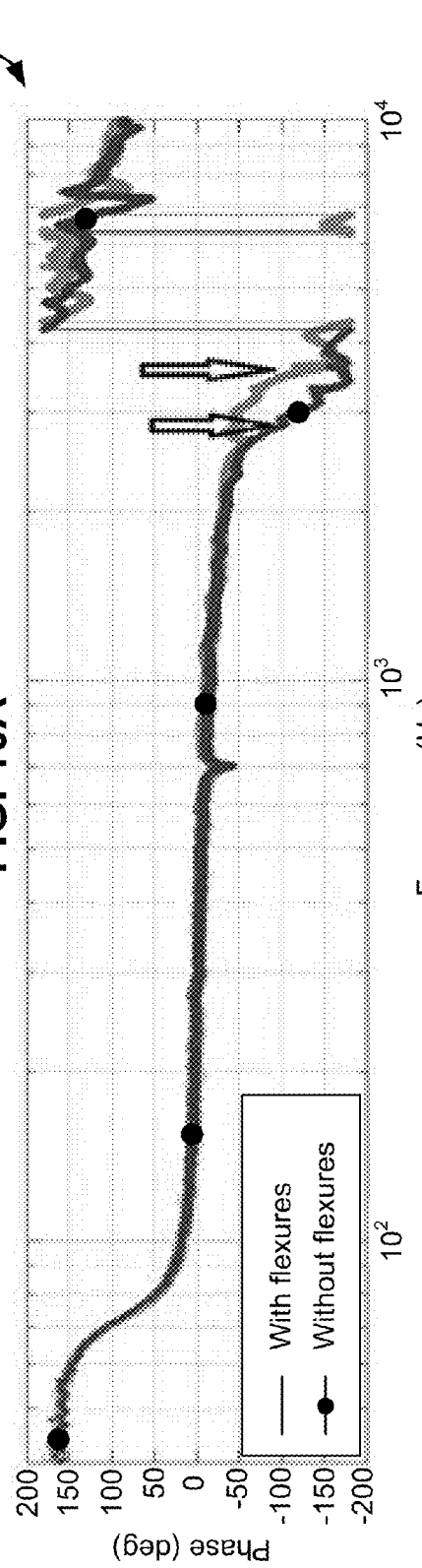
FIG. 10B is a graph of the phase vs. frequency for two embodiments.

Performance results for embodiments with and without flexures as disclosed herein are illustrated in the graphs 1000, 1050 of FIGS. 10A-10B. Specifically, graphs 1000, 1050 depict transfer functions which illustrate the performance of two different apparatuses resulting from inducing motion in the fine motion direction. During the fine motion, the motion of a point of interest on the apparatuses was recorded and plotted with respect to frequency.

As an actuator assembly undergoes a dynamic high-frequency mode, e.g., during operation, the head experiences a pitching motion once a certain frequency has been reached. By implementing flexures as disclosed herein, the operating frequency which induces such pitching motion is increased, thereby improving performance. Accordingly, the transfer functions of graphs 1000, 1050 illustrate the improvements achieved by the different embodiments disclosed herein having flexures over those without flexures.

Looking specifically, to graph 1000, gain is plotted with respect to frequency. As shown, the hump (indicated by the leftmost arrow) represents the initiation of a pitching motion which occurs at just under a frequency of about 3 kHz for the case which does not include flexures. This pitching mode becomes the limiting mode in the compensator and hence restricts achievable bandwidth. However, with the implementation of flexures, the hump (indicated by the rightmost arrow) is pushed up to a higher frequency of about 3.5 kHz. Thus, graph 1000 illustrates the attenuation of pitching motion by implementing flexures as described above. Moreover, this increase in the operable frequency range is helpful for increasing the achievable bandwidth of the system. The improvements shown in the data of graph 1000 are also apparent in the phase vs. frequency plot of graph 1050.

Again, by implementing flexures as described in the various embodiments herein, the onset of pitching motion is only experienced at frequencies higher than achievable using conventional products. Thus, pitching motion has a reduced impact on the anticipated bandwidth of embodiments implementing flexures as described herein.

It follows that various embodiments described herein are desirably able to resist pitching motion of magnetic heads without inhibiting the skew motion of the heads by implementing flexures which are resilient in the in-plane direction of the flexures, yet having an extent of torsional freedom, thereby allowing for skew motion to occur. It should also be noted that although many of the embodiments herein are described in terms of magnetic tape, similar and/or the same results may be achieved by implementing flexures with actuators of different media and/or applications to achieve the reduction of pitching motion thereof. Thus, the various embodiments described herein are in no way limited to implementations which include magnetic tape.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. An apparatus, comprising:
a pivot assembly pivotably supporting a head carriage assembly;
a motor coupled to the head carriage assembly for rotatably positioning the head carriage assembly about an axis of skew which extends perpendicular to a plane defined by an intended direction of media movement across the head carriage assembly and a direction of fine motion of the head carriage assembly, the fine motion direction being oriented perpendicular to the intended direction of media movement;

a linear assembly supporting the pivot assembly and the head carriage assembly, the linear assembly being configured to move along the fine motion direction; and a first flexure extending from the head carriage assembly to the linear assembly, the first flexure permitting the rotatable positioning of the head carriage assembly about the axis of skew, the first flexure resisting pitching movement of the head carriage assembly relative to the linear assembly.

2. The apparatus as recited in claim 1, comprising a second flexure extending between the head carriage assembly and the linear assembly, the second flexure permitting the rotatable positioning of the head carriage assembly about the axis of skew.

3. The apparatus as recited in claim 2, wherein the second flexure is positioned symmetrically relative to the first flexure about the axis of skew.

4. The apparatus as recited in claim 1, wherein a mounting point of the first flexure to the head carriage assembly is offset from a mounting point of the first flexure to the linear assembly in the fine motion direction.

5. The apparatus as recited in claim 1, wherein the first flexure has a rectangular cross section taken perpendicular to a longitudinal axis thereof, wherein a dimension of the cross section is longer in the fine motion direction than the intended direction of media movement.

6. The apparatus as recited in claim 1, wherein the first flexure extends from the head carriage assembly to the linear assembly in a direction generally parallel to the axis of skew.

7. The apparatus as recited in claim 1, wherein the first flexure is resiliently deformable.

8. The apparatus as recited in claim 1, wherein the first flexure has a generally L-shaped profile.

9. The apparatus as recited in claim 1, wherein the motor is an electromagnetic motor.

10. The apparatus as recited in claim 9, wherein a current applied to the electromagnetic motor induces a movement of the head carriage assembly about the axis of skew for positioning the head carriage assembly relative to the intended direction of media movement.

11. The apparatus as recited in claim 1, wherein the first flexure is directly coupled to the head carriage assembly and the linear assembly, wherein the flexure is configured to prevent the pitching movement by the direct coupling.

12. The apparatus as recited in claim 1, comprising:
a magnetic head mounted to the head carriage assembly;
a drive mechanism for passing a magnetic medium over the magnetic head; and
a controller electrically coupled to the motor.

13. An apparatus, comprising:
a pivot assembly pivotably supporting a head carriage assembly;
a motor coupled to the head carriage assembly for rotatably positioning the head carriage assembly about an axis of skew which extends perpendicular to a plane defined by an intended direction of tape movement across the head carriage assembly and a direction of fine motion of the head carriage assembly, the fine motion direction being oriented perpendicular to the intended direction of tape movement;
a linear assembly supporting the pivot assembly and the head carriage assembly, the linear assembly being configured to move along the fine motion direction;
a first flexure extending from the head carriage assembly to the linear assembly, the first flexure permitting the rotatable positioning of the head carriage assembly about the axis of skew, the first flexure resisting pitching movement of the head carriage assembly relative to the linear assembly;
a magnetic head mounted to the head carriage assembly;
a drive mechanism for passing a magnetic tape over the magnetic head; and
a controller electrically coupled to the motor.

14. The apparatus as recited in claim 13, comprising a second flexure extending between the head carriage assembly and the linear assembly, the second flexure permitting the rotatable positioning of the head carriage assembly about the axis of skew.

15. The apparatus as recited in claim 14, wherein the second flexure is positioned symmetrically relative to the first flexure about the axis of skew.

16. The apparatus as recited in claim 13, wherein a mounting point of the first flexure to the head carriage assembly is offset from a mounting point of the first flexure to the linear assembly in the fine motion direction.

17. The apparatus as recited in claim 13, wherein the first flexure extends from the head carriage assembly to the linear assembly in a direction generally parallel to the axis of skew.

18. The apparatus as recited in claim 13, wherein the first flexure is resiliently deformable.

19. The apparatus as recited in claim 13, wherein the first flexure has a generally L-shaped profile.

20. The apparatus as recited in claim 13, wherein the motor is an electromagnetic motor.

* * * * *